United States Patent [19]
Kay

[11] Patent Number: 4,949,746
[45] Date of Patent: Aug. 21, 1990

[54] FLUID CONTROL VALVES

[75] Inventor: Francis X. Kay, Buckingham, England

[73] Assignee: F.X.K. Patents Limited, Addington, England

[21] Appl. No.: 370,730

[22] Filed: Jun. 23, 1989

[30] Foreign Application Priority Data

Jun. 23, 1988 [GB] United Kingdom ............... 8814925

[51] Int. Cl.$^5$ ............................................. G05D 16/00
[52] U.S. Cl. ...................................... 137/82; 137/469
[58] Field of Search ............... 137/82, 84, 469, 625.6, 137/625.61

[56] References Cited

U.S. PATENT DOCUMENTS

| | | | |
|---|---|---|---|
| 1,963,267 | 4/1959 | Bancroft | 251/333 |
| 3,125,109 | 3/1984 | Krueter | 137/82 |
| 3,174,499 | 3/1985 | Mott | 137/82 |
| 3,426,970 | 2/1969 | Hedlund | 137/82 X |
| 3,645,293 | 2/1972 | Pedersen | 137/820 X |
| 3,734,117 | 5/1973 | Atkinson | 137/82 |
| 3,817,488 | 6/1974 | Mack | 251/30 |
| 3,835,876 | 9/1974 | Laakaniemi | 137/82 |
| 3,982,554 | 9/1976 | Saito | 137/82 |
| 4,196,751 | 4/1980 | Fischer et al. | 137/625.65 |

FOREIGN PATENT DOCUMENTS 1888246 3/1959 France .

OTHER PUBLICATIONS

"The Development of Some Low Pressure Jet Sensing Techniques", F X Kay, Sep. 1973.

Primary Examiner—Alan Cohan
Attorney, Agent, or Firm—Vaden, Eickenroht, Thompson & Boulware

[57] ABSTRACT

A fluid control valve having a discharge port controlled by an obturator is characterised by the discharge port being shaped to cause a marked drop in back pressure at a small critical opening distance of the obturator from the port, thereby to provide impetus to initiating discharge. The discharge port has effectively a concave surrounding surface for this purpose. To achieve good sealing with light loading, the port preferably also has a convex surface immediately surrounding its orifice. The preferred configuration is a convex surface bounded by a wall. The obturator may be resiliently loaded to enable its response to dynamic effects of fluid flow to enhance opening "lift". The obturator may be, e.g. a lever, a diaphragm or the armature of a solenoid.

9 Claims, 2 Drawing Sheets

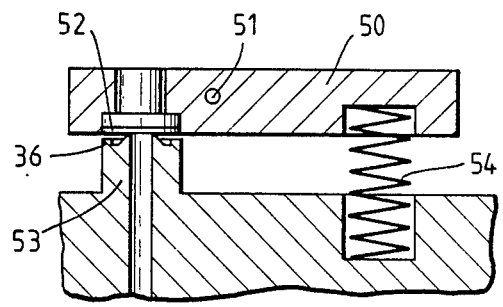
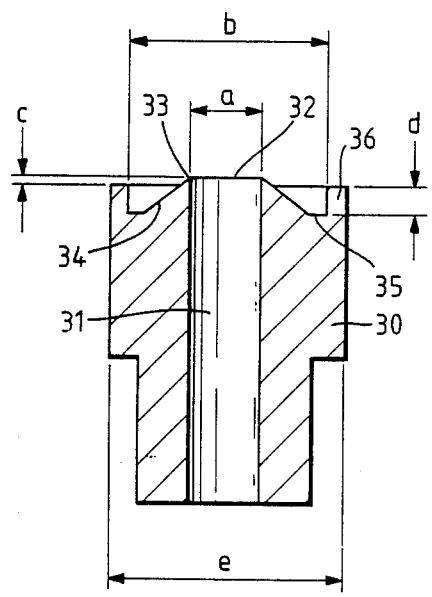
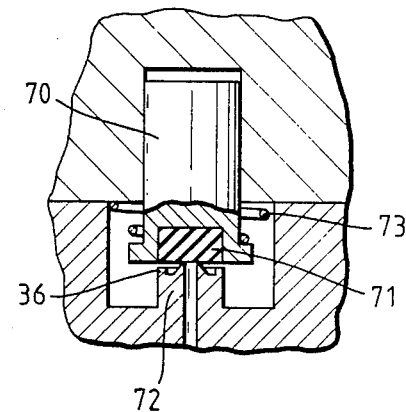
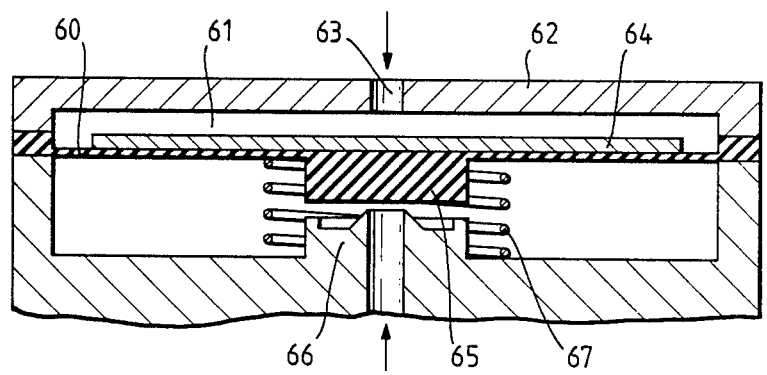

FLUID CONTROL VALVES

BACKGROUND OF THE INVENTION

1. Field of the Invention

This invention concerns fluid control valves of the type in which fluid flow through a discharge port controlled by an obturator movable towards and away from the port provides a valve control effect. Such valves often include a control orifice in the fluid flow path upstream of the discharge port, this control orifice being of smaller cross-section than the discharge port so that the pressure of the fluid between the control orifice and the discharge port can be affected by the rate of flow through the discharge port as controlled by the obturator. In this arrangement, the fluid pressure between the discharge port and the control orifice is utilised to actuate a valve member, for instance by being applied to one side of a double-acting piston or diaphragm serving as an actuator for a valve member. The invention will be explained in connection with this arrangement but, as will be discussed, the invention is also applicable to fluid control valves without such a control orifice, i.e. valves in which the obturator provides a simple flow control function, as in a poppet valve.

2. Background Discussion

Typically in fluid control valves of this type the discharge port is formed as an orifice in a generally convex surface facing the obturator, the actual shape of this surface usually resulting from a consideration of manufacturing convenience. However, the shape of this surface affects the relationship between the position of the obturator and the fluid pressure immediately upstream of the discharge port over a small range of positions of the obturator relatively to the discharge port, and that this effect can be utilised to improve the performance of the valve.

If the fluid pressure immediately upstream of the discharge port, for instance between the discharge port and a smaller upstream control orifice, is measured for various positions of the obturator, it is found that this "back pressure" varies between a maximum when the obturator effectively seals the discharge port, and a minimum when the obturator is spaced from the discharge port by a distance equivalent to approximately one-third of the discharge port diameter. If the results are plotted graphically, for most positions of the obturator between these extremes there is a regular relationship between the back pressure and the obturator position: that is to say the plot is essentially a smooth curve. However over a small range of positions the relationship is irregular, giving rise to a "kink" in the curve. The extent of the irregularity depends on the shape of the surface facing the obturator and in which the discharge port is formed. Perhaps fortuitously, the irregularity is least — that is, the kink is least pronounced — when the discharge port is provided by a relatively sharp-edged orifice in a convex, e.g. frustoconical, surface facing the obturator, the conventional configuration in this type of valve. See "The Development of some Low Pressure Jet Sensing Techniques" (F.X. Kay) Paper No. 21 at the First European Fluid Power Conference, National Engineering Laboratory, East Kilbride, Scotland, Sept. 1973.

SUMMARY OF THE INVENTION

The invention consists in the exploitation of this irregularity to achieve advantageous characteristics in a fluid control valve of the aforesaid type. Thus in a fluid control valve in accordance with the invention, the aforesaid irregularity is enhanced by suitable choice of the shape of the surface surrounding the discharge port and facing the obturator. Additionally, in certain embodiments of the invention the obturator is made responsive to the static and dynamic forces applied thereto by the fluid flowing through the discharge port in a manner to complement the effect of the said pressure irregularity.

Thus in one aspect the present invention provides a fluid control valve comprising a discharge port and an obturator movable towards and away from such port to control flow therethrough, characterised in that the discharge port is defined by an orifice surrounded by a narrow annular wall spaced radially outwardly from the boundary of the orifice.

In effect, this configuration of the discharge ports is equivalent to that of an orifice in a concave surrounding surface, maximising the aforesaid irregularity in the back pressure/obturator position relationship, providing the valve with the performance advantages hereinafter discussed. However, the conventional configuration of an orifice in a convex surrounding surface has some advantages in enabling sealing with low obturator thrust— desirable in a rapid-response device— and in preferred embodiments of the invention those advantages of the conventional configuration are retained by giving the discharge port a configuration that secures the sealing advantages of the convex surrounding surface and the performance attributes of a concave surrounding surface.

Thus, preferably the discharge port is defined by an orifice in a convex annular land that is bounded by the said wall. The convex annular land may for instance comprise a hemispherical or a frustoconical surface surrounding the orifice and bonded by the wall. There may be an intervening flat annulus between the convex land and the wall.

Preferably, moreover, the discharge port orifice is positioned more forwardly— that is to say nearer to the obturator— than the front extremity of the said wall.

The orifice preferably has a sharp-edged boundary.

The obturator may take many forms. It may for instance comprise a pivoted lever as in the well-known lever bleed-controlled servovalve. The obturator may be arranged for mechanical or electro-mechanical operation, as by a solenoid. Preferably the obturator is movable in response to thrust deriving from fluid discharging from the discharge port.

BRIEF DESCRIPTION OF THE DRAWINGS

FIG. 4 illustrates a preferred configuration for the discharge port of a valve embodying the invention;

FIG. 5 is a schematic showing a lever-type obturator in a valve embodying the invention;

FIG. 6 is a schematic showing an obturator loaded by a flexible diaphragm; and

FIG. 7 is a schematic showing a solenoid-actuated obturator.

DESCRIPTION OF PREFERRED EMBODIMENTS

Figure 1:
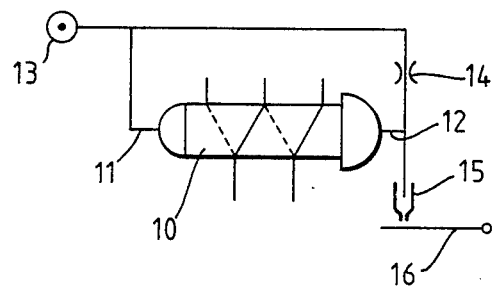
FIG. 1 is a diagrammatic representation of a fluid control valve of the type to which the invention is applicable.

FIG. 1 is a diagrammatic representation of a fluid control valve of the type to which the invention is applicable. The specific valve type shown is a double-piloted five-port valve represented symbolically at 10 and having a spool or the equivalent that establishes the broken line connections shown in a first end position and the full line connections in a second end position, switching between these end positions being accomplished by changing the balance of forces acting at opposite ends of this spool. In this particular valve type, the force balance results from servopressure applied at pilot ports 11, 12 and the arrangement is such that when the same servopressure is applied at each of ports 11 and 12, the spool is shifted to the first end position as a result of arranging for the servopressure at a port 12 to produce a greater force on the spool than the same pressure applied at port 11. This result may be achieved, for instance, by differential area effects or by spring bias, as is well understood in the art. The consequence of this arrangement is that by maintaining constant servopressure at port 11 the valve 10 can be switched between its two end positions by control of the servopressure at port 12. FIG. 1 illustrates the typical connection of a servopressure source 13 directly to the pilot port 11 and indirectly to the pilot port 12 by a connection including a throttle or control orifice 14, the pilot port 12 also being connected to a discharge port 15 controlled by an obturator 16 movable towards and away from the discharge port 15. The discharge port 15 has an orifice of cross-sectional area greater than that of the control orifice 14 so that when the obturator 16 is well spaced from the discharge port the pressure at pilot port 12 effectively falls to zero.

Figure 2:
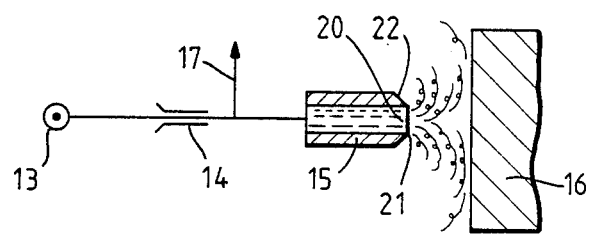
FIG. 2 is a schematic showing the relationships between the control orifice, discharge port and obturator in a valve as represented in FIG. 1.

FIG. 2 illustrates schematically the physical relationship of the obturator 16 to the discharge port 15 in the typical arrangement of a valve conforming with the diagrammatic showing of FIG. 1. The servopressure supply from source 13 through control orifice 14 to the port 15 is shown, with the branch connection 17 that leads to the pilot port 12 in the arrangement of FIG. 1. As is represented in FIG. 2, when the obturator 16 is spaced from the port 15, fluid discharging from the latter impinges on the obturator and is deflected laterally and it is this deflection and flow of the fluid by and over the obturator surface that gives rise to anomalous effects when the pressure at connection 17 is plotted against the position of the obturator 16 in terms of its distance from the port 15.

Figure 3:
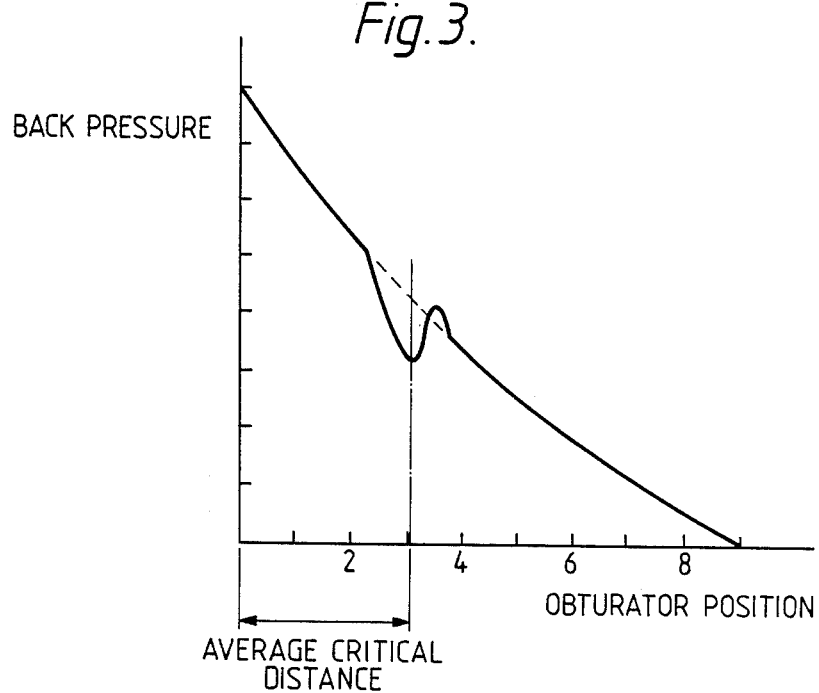
FIG. 3 is a representation of the typical graph obtained by plotting back pressure against obturator position in a valve as represented by FIG. 1.

FIG. 3 shows a typical plot of pressure at connection 17— "back pressure"— against obturator distance from the port 15 and it will be seen that at distance zero, that is, when the obturator 16 effectively seals the discharge port 15, the back pressure is at a maximum and equates with the pressure at source 13 in the case of the arrangements diagrammed in FIGS. 1 and 2. In general, as the obturator moves away from the port 15, the back pressure falls regularly as a smooth curve to a value of approximately zero when, typically, the obturator 16 is spaced from the port 15 by a distance corresponding to about one-third of the diameter of the discharge port orifice.

However, over a short range of distances of the obturator from the port 15 the relationship between back pressure and obturator position is irregular. In the plot of FIG. 3, the irregularity is shown as occuring over the range two to four units of obturator distance from the port 15 and it will be seen that the irregularity results in a "kink" in the otherwise smooth curve of back pressure against obturator position.

In the range of obturator positions over which this irregularity occurs, called herein the "critical distance range", the back pressure shows a minimum value at about the mid-point of the range, i.e. when the obturator is approximately three units of distance from the discharge port for the case represented in FIG. 3. This is termed the "average critical distance".

It has been discovered that the magnitude of the irregularity or "kink" in the back pressure/obturator position relationship depends upon the shape of the structural surface surrounding the orifice of the discharge port and facing the obturator. FIG. 2 illustrates the conventional configuration of the discharge port 15, having a circular orifice 20 bounded by a sharp edge 21 formed in a convex, e.g. frustoconical, surface 22. It so happens that this particular configuration gives rise to the minimum irregularity in the back pressure/obturator position relationship.

For clarity FIG. 2 shows the obturator 16 widely spaced apart from the discharge port 15. As noted the irregularity occurs when the obturator is relatively close to the discharge port, say about one-tenth of the diameter of the orifice 20.

It is believed that the irregularity is a consequence of the "venturi" effect consequent on the flow of fluid generally radially of the discharge port orifice and through a narrow throat represented by the gap between the obturator and the edge 21 defining the boundary of the orifice. The fluid accelerates through this gap and then slows as, effectively, the width of the gap increase due to the shape of the surface 22. The acceleration of the fluid is assumed to result in a pressure reduction in accordance with Bernoulli's Theorem, mitigating part of the occlusive effect of the obturator.

However, whatever the reason, it is observed that the irregularity or kink becomes more pronounced as the structure of the discharge port surface facing the obturator is changed from that illustrated in FIG. 2. That is, if the surface 22 is made less convex the irregularity becomes more pronounced, the maximum irregularity being shown in the case of a concave surface of significant width surrounding the orifice 20.

Control valves in accordance with the invention exploit this irregularity to achieve desirable operating characteristics.

Control valves of the type to which the invention is applicable are often required to respond extremely rapidly to small movements of the obturator. Considering the opening movement of the obturator away from the position in which it seals the discharge port, in a valve arrangement such as illustrated in FIG. 1, a typical requirement is that the servopressure at pilot port 12 shall fall as rapidly as possible following commencement of movement of the obturator. This implies a rapid build up of fluid flow through the discharge port in order to exhaust the fluid previously trapped between the discharge port and the control orifice, including the fluid volume within the pilot system associated with the pilot port 12.

It will therefore be understood that by enhancing the irregularity in the back pressure/obturator position relationship, the back pressure at the discharge port will drop significantly when the obturator reaches the critical distance range from the discharge port and thus conduce to initiation of rapid flow of fluid through the discharge port in advance of the obturator reaching the more remote position at which in the conventional arrangement the same back pressure would be reached. That is to say, the abnormally low back pressure that occurs in the critical distance range provides enhanced pressure differential to accelerate flow of fluid to and through the discharge port.

Moreover, once the fluid flow through the discharge port has been established, its dynamic effects can be exploited to assist further opening movement of the obturator and further enhance the response characteristics of the valve.

FIG. 4 of the drawings illustrates a preferred configuration for the discharge port of a control valve embodying the invention. Thus as shown in this figure, the discharge port structure comprises a body 30 that is conveniently circular in section and formed with an axial bore 31 that terminates in an orifice 32 bounded by a sharp edge 33 surrounded by a frustoconical surface 34 as in the conventional configuration (FIG. 2). However, outboard of the frustoconical surface 34 there is a flat annular land 35 outwardly bounded by an annular wall 36.

Preferably, as shown, the orifice 32 is disposed forwardly of the forward extremity of the wall 36, so that when the edge 33 is engaged by a flat sealing surface of an obturator, a gap exists between the obturator and the wall 36.

The proportions of the device may be varied to achieve particular effects in operational installations, the proportions shown in FIG. 4 being appropriate in most applications to control valves of common sizes and conventional design.

Thus the important dimensions of the port illustrated in FIG. 4 are indicated at (a) the orifice diameter; (b) the internal diameter of the wall 36; (c) the projection of the orifice boundary 33 forwardly of the wall 36; (d) the height of the wall 36; and (e) the external diameter of the wall 36. In typical devices having the proportions illustrated these marked dimensions might fall within the following ranges:

(a) 0.9–3.0 mm
(b) 2.0–10 mm
(c) 0.05–0.5 mm
(d) 0.4–2.0 mm
(e) 3–12 mm

Thus, for instance, a typical device has the dimension (a) 0.95 mm; (b) 2.8 mm; (c) 0.25 mm; (d) 0.45 mm; (e) 3.25 mm. It should be understood that the radial thickness of the wall 36 should be as small as practical, taking account of manufacturing and material stress considerations, because the front end of the wall is intended to function as a relatively sharp edge facing the obturator. In larger sizes of the device the front end of the wall may be rounded or chamfered.

Normally, in a control valve of the type to which the invention is applicable, the thrust on the obturator due to the pressure of discharging fluid from the discharge port will be a function of the discharge port area and the degree of its occlusion by the obturator. However, in a valve having a discharge port configured in accordance with the invention, the discharged fluid enters the area between the orifice 32 and the surrounding wall 36 and the thrust against the obturator is increased as a consequence of the fluid pressure then acting over a larger area of the obturator.

Accordingly, if the obturator should take the form of a lightly loaded mechanism, such as a pivoted lever having a seating that in the closed position is held sealingly against the discharge port by means of a light spring or equivalent, the extra thrust generated as the valve cracks open will counterbalance some of the loading thrust and thus assist further opening movement of the obturator. If the obturator has freedom to respond to the thrust thereon so generated, the effect will be that an initial opening movement of the obturator will be supplemented by a further opening movement or "lift" due to the thrust of the discharging fluid on the obturator. With appropriate design, a snap-action effect will be achieved.

While the invention is applicable to control valves having mechanically actuated obturators it is also applicable and especially useful in fluid control valves having obturators actuated by fluid pressure or by magnetic influence, as in a solenoid-controlled valve, because such arrangements enable the thrust due to discharging fluid to enhance the rate of response of the valve to an opening signal.

FIGS. 5, 6 and 7 illustrate various applications of the invention. FIG. 5 illustrates the application of the invention to a lever-bleed valve, in which the obturator is shown as a lever 50 pivoted at 51 and having a flexible seating 52 for engagement with a discharge port 53 of the configuration shown in FIG. 4 and having the characteristic wall 36 of the latter. The lever 50 is loaded by light spring shown at 54 and is illustrated in the valve-closed position in which the seating 52 engages the edge bounding the orifice of the discharge port.

FIG. 6 illustrates an obturator 60 in the form of a flexible diaphragm bounding a chamber 61 formed in a suitable enclosure 62 and to which operating pressure fluid can be admitted and discharged through a port 63. The diaphragm 60 carries a backing plate 64 and a flexible seating 65 for engagement with the discharge port shown at 66 and again of the configuration illustrated in FIG. 4. In this arrangement the obturator is biassed to its valve-open position with the seating 65 spaced apart from the discharge port 66 as shown, by means of a spring shown at 67.

FIG. 7 illustrates the application of the invention to a fluid flow control valve having a solenoid-actuated obturator 70 in the form of the armature of a solenoid that is only partly illustrated, the obturator 70 being fitted with a flexible seating 71 for engagement with the discharge port 72 that once again is of the configuration shown in FIG. 4 and has the characteristic wall 36 of the latter. The obturator is biassed towards th valve-closed position by means of a spring shown at 73.

As noted, the application of the invention to solenoid-controlled valves is particularly advantageous because, especially in small, high-speed, valves there are constraints upon the actuating forces that can be generated and indeed the force/armature position characteristic of a solenoid tends normally to impede rapid operation. Thus, as is known, the force generated by a solenoid when its armature is extended—as in the valve-closing position in a valve of the type of interest—is at its minimum, increasing as the armature moves into the coil structure. In an arrangement such as shown in FIG. 7, the magnetic force acting to move the obturator 70 away from the discharge port 72 at the commencement of the valve-opening movement is usefully supplemented by the static and dynamic thrusts of the fluid discharging from the port, to accelerate the opening movement of the obturator.

Thus it will be seen that by use of a discharge port configuration in accordance with the invention the irregularity or kink in the back pressure/obturator position relationship is exploited to accelerate flow of fluid through the discharge port during the initial opening movement of the obturator, thereby to enhance the rate at which the valve responds to opening movement of the obturator, while by making provision for the obturator to respond to the enhanced thrust thereon by the discharging fluid, as a consequence of the port configuration, further enhancement of the valve response can be achieved.

The principle of the invention is widely applicable to fluid control valves and may, for instance, be applied in simple poppet valves. That is, the obturator/discharge port structure may provide, directly, a fluid flow controlling function rather than a servopressure controlling function as in the arrangement illustrated in FIG. 1.

I claim:

1. A fluid control valve comprising a discharge port and an obturator movable towards and away from such port to open and close the port, said discharge port having an orifice which is bounded by a sharp edge on which the obturator seats to close the port and an annular wall spaced radially outwardly from and surrounding the boundary of the orifice and which is sufficiently narrow at its end facing the obturator as to minimize surface friction resulting from fluid flow therepast.

2. The fluid control valve of claim 1, wherein said discharge port comprises a convex annular land surrounding said orifice and bounded by said wall.

3. The fluid control valve of claim 2, wherein said convex annular land comprises a frustoconical surface surrounding the orifice and bounded by said wall.

4. The fluid control valve of claim 2, wherein said convex annular land comprises a convex surface and a flat annulus between the convex surface and the wall.

5. The fluid control valve of claim 3 or 4, wherein said discharge port orifice is positioned forwardly of the front oxtromity of said wall.

6. The fluid control valve of claim 2, said obturator being movable in response to thrust deriving from fluid discharging from the discharge port.

7. The fluid control valve of claim 6, wherein the obturator comprises a lever loaded by resilient means.

8. The fluid control valve of claim 6, wherein the obturator comprises a flexible diaphragm movable by fluid pressure.

9. The fluid control valve of claim 6, wherein the obturator comprises the armature of a solenoid.

* * * * *